(12) United States Patent
Wiltshire et al.

(10) Patent No.: US 12,099,160 B2
(45) Date of Patent: Sep. 24, 2024

(54) PROCESSING WELLBORE DATA TO DETERMINE SUBTERRANEAN CHARACTERISTICS

(71) Applicant: Landmark Graphics Corporation, Houston, TX (US)

(72) Inventors: Marcus David Michael Wiltshire, Grove (GB); Duncan Charles Hay, Bristol (GB)

(73) Assignee: Landmark Graphics Corporation, Houston, TX (US)

( * ) Notice: Subject to any disclaimer, the term of this patent is extended or adjusted under 35 U.S.C. 154(b) by 399 days.

(21) Appl. No.: 17/622,231

(22) PCT Filed: Jul. 12, 2019

(86) PCT No.: PCT/US2019/041660
§ 371 (c)(1),
(2) Date: Dec. 23, 2021

(87) PCT Pub. No.: WO2021/010946
PCT Pub. Date: Jan. 21, 2021

(65) Prior Publication Data
US 2022/0350048 A1    Nov. 3, 2022

(51) Int. Cl.
*G01V 20/00*        (2024.01)
(52) U.S. Cl.
CPC .................................... *G01V 20/00* (2024.01)
(58) Field of Classification Search
CPC .. G01V 20/00; G01V 2210/661; G01V 1/306; G01V 1/50; G01V 1/46
See application file for complete search history.

(56) References Cited

U.S. PATENT DOCUMENTS

2003/0233194 A1* 12/2003 Cook ....................... G01V 1/34
                                                                                            702/16
2010/0198638 A1    8/2010 Deffenbaugh et al.
(Continued)

FOREIGN PATENT DOCUMENTS

EP              2310880 B1      8/2017
WO    WO-2016187048 A1 * 11/2016 ............. E21B 43/00
WO           2017135972 A1      8/2017

OTHER PUBLICATIONS

Tong, Bin, and et al. "Learning to generate rock descriptions from multivariate well logs with hierarchical attention." In Proceedings of the 23rd ACM SIGKDD International Conference on Knowledge Discovery and Data Mining, pp. 2031-2040. 2017 (Year: 2017).*

(Continued)

*Primary Examiner* — Douglas Kay
(74) *Attorney, Agent, or Firm* — Kilpatrick Townsend & Stockton LLP (57) ABSTRACT

A computer system and method for determining subterranean rock composition is described in which user input data is received having a plurality of parameters defining a desired subterranean rock composition from a wellbore. Data associated with at least one geologic environment is received, which data contains data acquired from at least one wellbore. An analytical analysis is then conducted by a computer processor utilizing the user input data and the received geologic environment data to determine a match between the user desired subterranean rock composition and the received geologic environment data. Output graphic data is then determined and generated, based at least in part on the analytical analysis, on a computer graphical display consisting of a two-dimensional (2D) graphical representation indicating a region of the geologic environment having (Continued)

a match between the user desired subterranean rock composition and the received geologic environment data.

16 Claims, 6 Drawing Sheets

(56) References Cited

U.S. PATENT DOCUMENTS

| | | | |
|---|---|---|---|
| 2013/0076099 A1 | 3/2013 | Muetze et al. | |
| 2016/0202390 A1* | 7/2016 | Ramsay | E21B 49/005 |
| | | | 703/6 |
| 2017/0205531 A1* | 7/2017 | Berard | E21B 7/04 |
| 2018/0031732 A1* | 2/2018 | Mosse | G01V 20/00 |
| 2018/0047117 A1* | 2/2018 | Meehan | G06F 16/2291 |
| 2019/0383965 A1* | 12/2019 | Salman | G06N 3/08 |

OTHER PUBLICATIONS

Liu, Yuhua, and et al. "Visual analytics of stratigraphic correlation for multi-attribute well-logging data exploration." IEEE Access 7 (Jul. 2019): 98122-98135 (Year: 2019).*

Mathers, S. J., B. Wood, and H. Kessler. "GSI3D 2011: software manual and methodology." (2011) (Year: 2011).*

PCT App. No. PCT/US2019/041660, "International Search Report and Written Opinion", Apr. 10, 2020, 11 pages.

* cited by examiner

PROCESSING WELLBORE DATA TO DETERMINE SUBTERRANEAN CHARACTERISTICS

TECHNICAL FIELD

The embodiments disclosed herein generally relate to an improved data processing system and in particular, to a method and apparatus for analyzing data from a wellbore.

BACKGROUND

Geophysical and geologic study of the subsurface structure of the earth continues to be an important field of endeavor for several reasons. The continued search for producing reservoirs of hydrocarbons, such as oil and gas, is a particularly important motivation for obtaining information about the earth's subsurface.

Rock can be formed of an aggregate of material. For example, rock may be formed of one or more of minerals, organic matter, volcanic glass, etc. Rock may include a single type of mineral or many types of minerals. Rocks may be characterized by types such as, for example, sedimentary rocks like sandstone and limestone (e.g., formed at the Earth's surface through deposition of sediments derived from weathered rocks, biogenic activity or precipitation from solution); igneous rocks (e.g., originating deeper within the Earth, where the temperature may be high enough to melt rocks, to form magma that can crystallize within the Earth or at the surface by volcanic activity); and metamorphic rocks (e.g., formed from other preexisting rocks during episodes of deformation of the Earth at temperatures and pressures high enough to alter minerals but inadequate to melt them). Changes to rock may occur by the activity of fluids in the Earth and movement of igneous bodies or regional tectonic activity. Rocks may be recycled from one type to another by the constant changes in the Earth. As such, rocks may be considered to have associated "histories", which can add a temporal aspect to rocks found today.

Operations, such as geophysical surveying, drilling, logging, well completion and production, are typically performed to locate and gather valuable downhole fluids. Surveys are often performed using acquisition methodologies, such as seismic mapping, resistivity mapping, etc. to generate images of underground formations. These formations are often analyzed to determine the presence of subterranean assets, such as valuable fluids or minerals, or to determine if the formations have characteristics suitable for storing fluids. Although the subterranean assets are not limited to hydrocarbons such as oil, throughout this document, the terms "oilfield" and "oilfield operation" may be used interchangeably with the terms "field" and "field operation" to refer to a site where any types of valuable fluids or minerals can be found and the activities required to extract them. The terms may also refer to sites where substances are deposited or stored by injecting them into the surface using boreholes and the operations associated with this process. Further, the term "wellbore operation" refers to a field operation associated with a wellbore, including activities related to wellbore planning, wellbore drilling, wellbore completion, and/ or production using the wellbore.

The production of hydrocarbon and the stimulation design is historically based upon intrinsic properties of the rock such as petrophysical properties, lithology and age. The data acquired from the wellbore is highly valuable regarding hydrocarbon exploration/production. In order to optimize production and understand where fractures may be induced to optimize hydrocarbon exploration/production it is essential to correctly interpret wellbore data.

It is to be appreciated a key workflow in hydrocarbon exploration is screening of areas of the world for the presence and effectiveness of petroleum system elements (e.g., source, reservoir and seal rocks). This process helps an organization to refine their understanding regarding certain global subterranean regions with focus on hydrocarbon extraction.

Downhole data from a wellbore is a significant dimensional data input for understanding subterranean regions. For instance, in a typical exploration workflow, each downhole data event in a well bore is interpreted by a geoscientist in a stratigraphic context of age, lithology and environment of deposition with the results being stored in a database.

BRIEF DESCRIPTION OF THE DRAWINGS

For a more complete understanding of the disclosed embodiments, and for further advantages thereof, reference is now made to the following description taken in conjunction with the accompanying drawings in which.

DETAILED DESCRIPTION

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this present disclosure belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

It will be understood that the term "oil well drilling equipment", "oil well drilling system", "well site" or "wellbore" is not intended to limit the use of the equipment and processes described with those terms to drilling an oil well or a particular subterranean environment, as the illustrated embodiments of the present disclosure encompass wellbore data from any suitable subterranean environment, including, but not limited to any geologic environment that includes a sedimentary basin, a seabed, a reservoir, one or more fractures, etc. The terms also encompass drilling natural gas wells or hydrocarbon wells in general. Further, such wells can be used for production, monitoring, or injection in relation to the recovery of hydrocarbons or other materials from the subsurface. This could also include geothermal wells intended to provide a source of heat energy instead of hydrocarbons. It is to be understood the illustrated embodiments relate to subterranean operations and, more particularly, to apparatus and methods for monitoring and processing wellbore data from subterranean operations. A purpose of the illustrated embodiments is to enable users to rapidly upscale well data into single point representations for Two-Dimensional (2D) maps regarding a plurality of wellbores from a plurality of geographic regions. This enables users to efficiently, and graphically, summarize wellbore data and assess the presence of petroleum system elements spatially, thus facilitating a predictive computer analytical analysis in contrast to prior wellbore data control techniques.

As will be appreciated, the illustrated embodiments generally consist of a computer system and method for providing a geoprocessing tool utilizing a rule-based analytical process to automatically process downhole data associated with a wellbore. Preferably, an assessment is determined as to whether a specified age and rock lithology was interpreted in a wellbore in reference to input parameters defined by a user. Preferably downhole events are automatically summarized from a plurality of different global geographic regions which satisfy the input criteria for a given user-defined wellbore. These summary attributes are then graphically generated and outputted as 2D graphic representations to represent the validity of the petroleum system element on a displayed 2D map thus enabling a user to graphically comprehend wellbore depth data spatially regarding hydrocarbon exploration. A particular feature of the illustrated embodiment is it's scalability to process and analyze a plurality of wells from different global regions as a single processing routine, thus providing significant efficiency gains.

Figure 1:
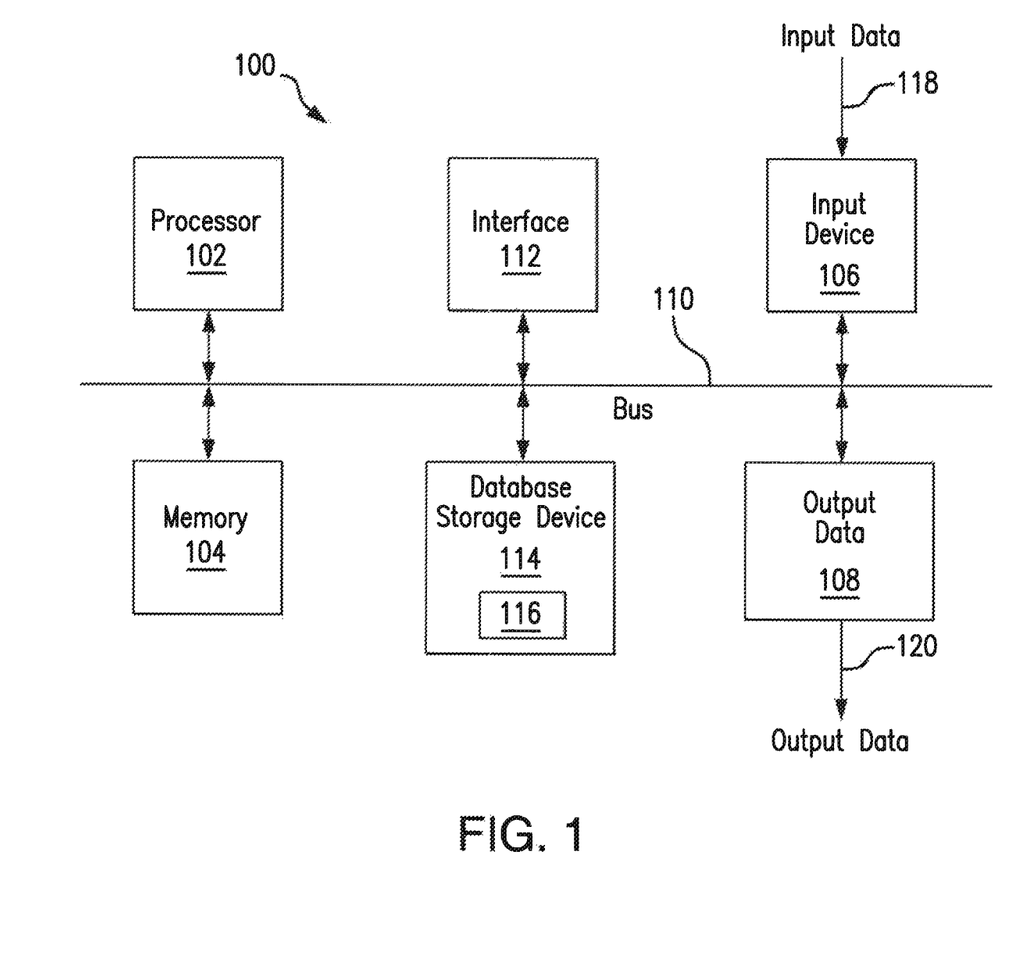
FIG. 1 is a block diagram illustrating a computer system, components of which are used with embodiments of the present disclosure.

Turning now descriptively to the drawings, in which similar reference characters denote similar elements throughout the several views, FIG. 1 depicts an exemplary computing system in which below illustrated embodiments may be implemented.

A generalized computing embodiment in which the illustrated embodiments can be realized is depicted in FIG. 1 illustrating a processing system 100 that may be used (or components thereof) with one or more embodiments described herein, e.g., as one of the components shown in the below described system 200 including one or more wellbore drilling systems. Processing system 100 generally consists of at least one processor 102, or processing unit or plurality of processors, memory 104, at least one input device 106 and at least one output device 108, coupled together via a bus or group of buses 110. In certain embodiments, input device 106 and output device 108 can be the same device. An interface 112 can also be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 can comprise more than one distinct processing device, for example to handle different functions within the processing system 100. Input device 106 receives input data 118 and can comprise, for example, a keyboard, a pointer device such as a pen-like device or a mouse, audio receiving device for voice controlled activation such as a microphone, data receiver or antenna such as a modem or wireless data adaptor, data acquisition card, etc. Input data 118 can come from different sources, for example keyboard instructions in conjunction with data received via a network. Output device 108 produces or generates output data 120 and can comprise, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 can be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 is adapted to allow data or information to be stored in and/or retrieved from, via wired or wireless communication means, at least one database 116. The interface 112 may allow wired and/or wireless communication between the processing unit 102 and peripheral components that may serve a specialized purpose. Preferably, the processor 102 receives instructions as input data 118 via input device 106 and can display processed results or other output to a user by utilizing output device 108. More than one input device 106 and/or output device 108 can be provided. It should be appreciated that the processing system 100 may be any form of terminal, server, specialized hardware, or the like.

It is to be appreciated that the processing system 100 may be a part of a networked communications system. Processing system 100 could connect to a network, for example the Internet or a WAN. Input data 118 and output data 120 can be communicated to other devices via the network. The transfer of information and/or data over the network can be achieved using wired communications means or wireless communications means. A server can facilitate the transfer of data between the network and one or more databases. A server and one or more databases provide an example of an information source.

Thus, the processing computing system environment 100 illustrated in FIG. 1 preferably operates in a networked environment using logical connections to one or more remote computers, servers and/or databases. The remote computer may be a personal computer, a tablet device, smart phone device, a server, a router, a network PC, a peer device, or other common network nodes, and typically includes many or all of the elements described above.

It is to be further appreciated that the logical connections depicted in FIG. 1 include a local area network (LAN) and a wide area network (WAN), but may also include other networks such as a personal area network (PAN). Such networking environments are commonplace in offices, enterprise-wide computer networks, intranets, and the Internet. For instance, when used in a LAN networking environment, the computing system environment 100 is connected to the LAN through a network interface or adapter. When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the computing system environment 100, or portions thereof, may be stored in a remote memory storage device. It is to be appreciated that the illustrated network connections of FIG. 1 are exemplary and other means of establishing a communications link between multiple computers may be used.

Figure 2:
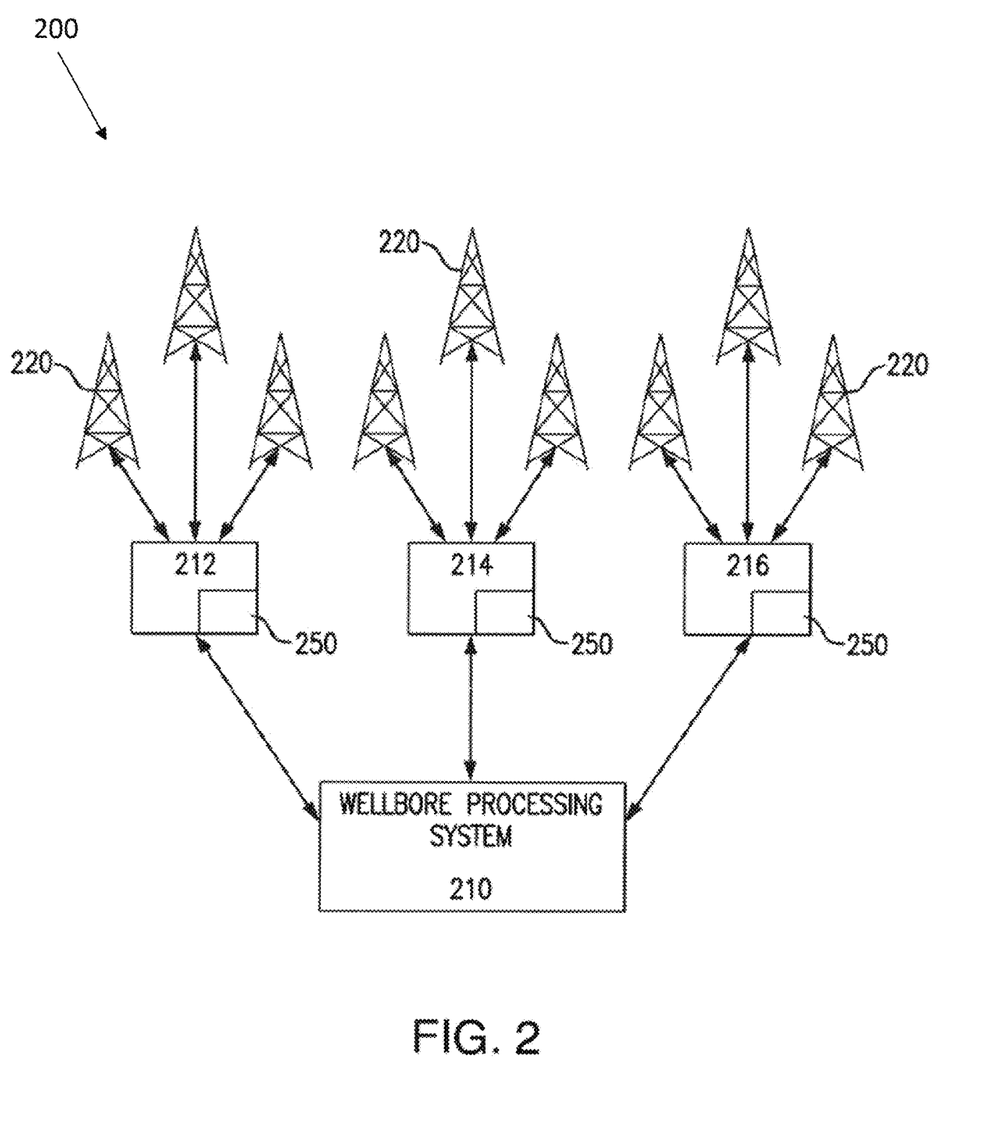
FIG. 2 is a system level diagram illustrating components of an illustrated embodiment communicatively coupled to a plurality wellbore environments.

FIG. 2 is a schematic block diagram of an example network computing system 200 in accordance with an illustrated embodiment that incorporates one or more components of the above described processing system 100. As explained above, in different embodiments these various devices are configured to communicate with each other in any suitable way, such as, for example, via a communication network such as the Internet. System 200 is only one example of a suitable system and is not intended to suggest any limitation as to the scope of use or functionality of the illustrated embodiments described herein. Regardless, system 200 is capable of being implemented and/or performing any of the functionality set forth herein.

System 200 includes at least one computer processing system 210 networked coupled to preferably a plurality of data sources 212-216 (e.g., computer database, memory and the like) storing wellbore data 250 associated with one or more global geologic environments having associated well sites. The wellbore data 250 including at least data related to subterranean rock composition gathered from acquired downhole data (described further below). The wellbore data 250 is preferably provided to each data source 212-216 from one or more well sites 220 each preferably including one or more well-drilling equipment and/or well drilling systems providing wellbore data using one or more known drilling techniques, including but not limited to, using a bore tool sensor device.

As will be understood and in accordance with an illustrated embodiment, wellbore processing system 210 is specifically configured to process the entirety of downhole data associated with one or more wellbores 220. Preferably, an assessment is determined as to whether a specified age and rock lithology was interpreted in a wellbore 220 based on the input parameters defined by users of the wellbore processing system 200. In an example embodiment, the wellbore processing system 200 may include features of a commercially available framework such as FAIRWAYFINDER™ cloud-hosted screening tools (Halliburton Energy Services, Inc. Houston Texas) or other such screening tools. It is noted these tools are preferably utilized in the early stages of the hydrocarbon exploration cycle, allowing the user to assess petroleum potential on a global to basin scale. It will further be appreciated that the illustrated embodiment of FIG. 2 is scalable to aggregate and analyze wellbore data from any global region to generate and display customized output data regarding certain user-defined subterranean rock composition in a readily discernible computerized graphic displayed format.

FIGS. 1 and 2 are intended to provide a brief, general description of an illustrative and/or suitable exemplary environment in which the illustrated embodiments may be implemented. FIGS. 1 and 2 are exemplary of a suitable environment and are not intended to suggest any limitation as to the structure, scope of use, or functionality of an illustrated embodiment. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3:
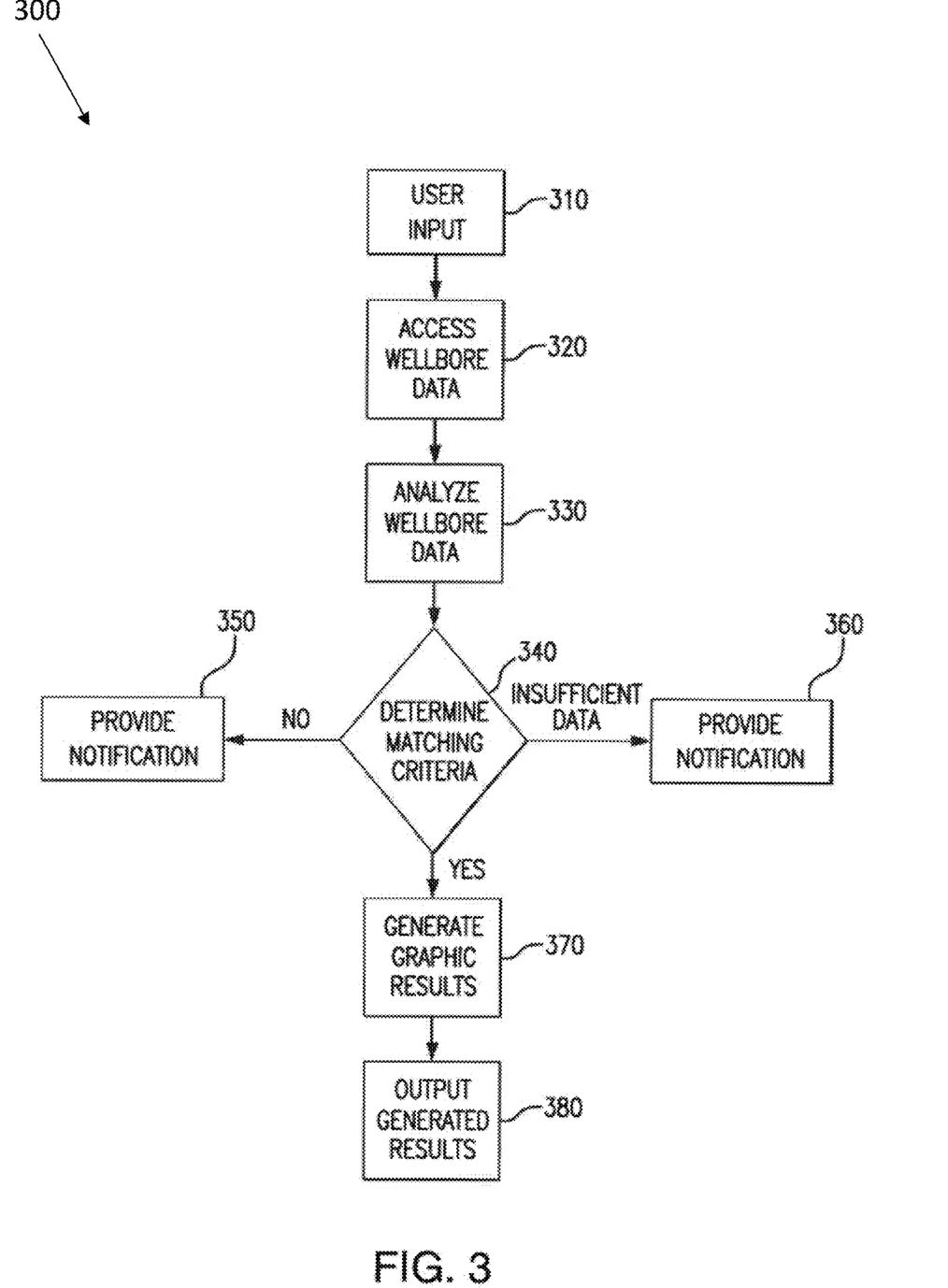
FIG. 3 is a flowchart illustrating operations of a method in accordance with embodiments of the present disclosure.

With the exemplary computer processing system 100 (FIG. 1) and wellbore computing system 200 (FIG. 2) being generally shown and discussed above, description of certain illustrated embodiments of the present disclosure will now be provided. With reference now to FIG. 3, aspects of the illustrated embodiments are described below with reference to flowchart illustrations and/or block diagrams of methods, apparatus (systems) and computer program products according to certain illustrated embodiments. It will be understood that each block of the flowchart illustrations and/or block diagrams, and combinations of blocks in the flowchart illustrations and/or block diagrams, can be implemented by computer program instructions. These computer program instructions may be provided to the wellbore processing system 210 of wellbore computing system 200 to produce a machine, such that the instructions, which execute via the processor of a computer processing system 100 or other programmable data processing apparatus, create means for implementing the functions/acts specified in the flowchart and/or block diagram block or blocks.

With reference now to FIG. 3, shown is a flow chart demonstrating implementation of the various exemplary embodiments with reference to process 300. It is noted that the order of steps shown in FIG. 3 is not required, so in principle, the various steps may be performed out of the illustrated order. Also certain steps may be skipped, different steps may be added or substituted, or selected steps or groups of steps may be performed in a separate application following the embodiments described herein. Starting at step 310, user input is provided to wellbore processing system 210 preferably including a plurality of parameters defining a desired subterranean rock composition. The user input parameters preferably include, but are not to be understood to be limited to, a specified age of stratigraphy and lithology defining the desired subterranean rock composition. Additional descriptive parameters of the desired subterranean rock composition may further be included, such as a desired depositional environment. Additional, one or more desired geological environments and/regions may be further included.

Once the user input is provided (step 310), the wellbore processing system 210 accesses wellbore data from a plurality of geologic environments and/or regions each having one or more wellbores 220 providing associated wellbore data (as described further below with reference to FIG. 4), step 320. Next, step 330, the wellbore processing system 200 is configured and operational to perform an analytical analysis of the user input data (step 310) with the accessed geologic environment data (step 320) acquired from the data sources 212-216 to determine a match between the user desired subterranean rock composition and the received geologic environment data, step 340. If determined in step 340 that there is no match found (e.g., the user specified a certain rock lithology having an age greater than 170 million years (Ma) and less than 180 Ma associated with a certain hydrocarbon deposit, which time period range associated with the user desired rock lithology was not present in any of the data sets accessed from the one or more data sources 212-216), then notification that no match was found is preferably provided to the user, where after a user may further refine a search query for a desired subterranean rock composition (step 350). It is to be appreciated the wellbore processing system 210 may be configured and operational to generate and display associated output data in a 2D spatial map as shown in FIG. 5 representative of such results (as discussed further below)

Figure 6:
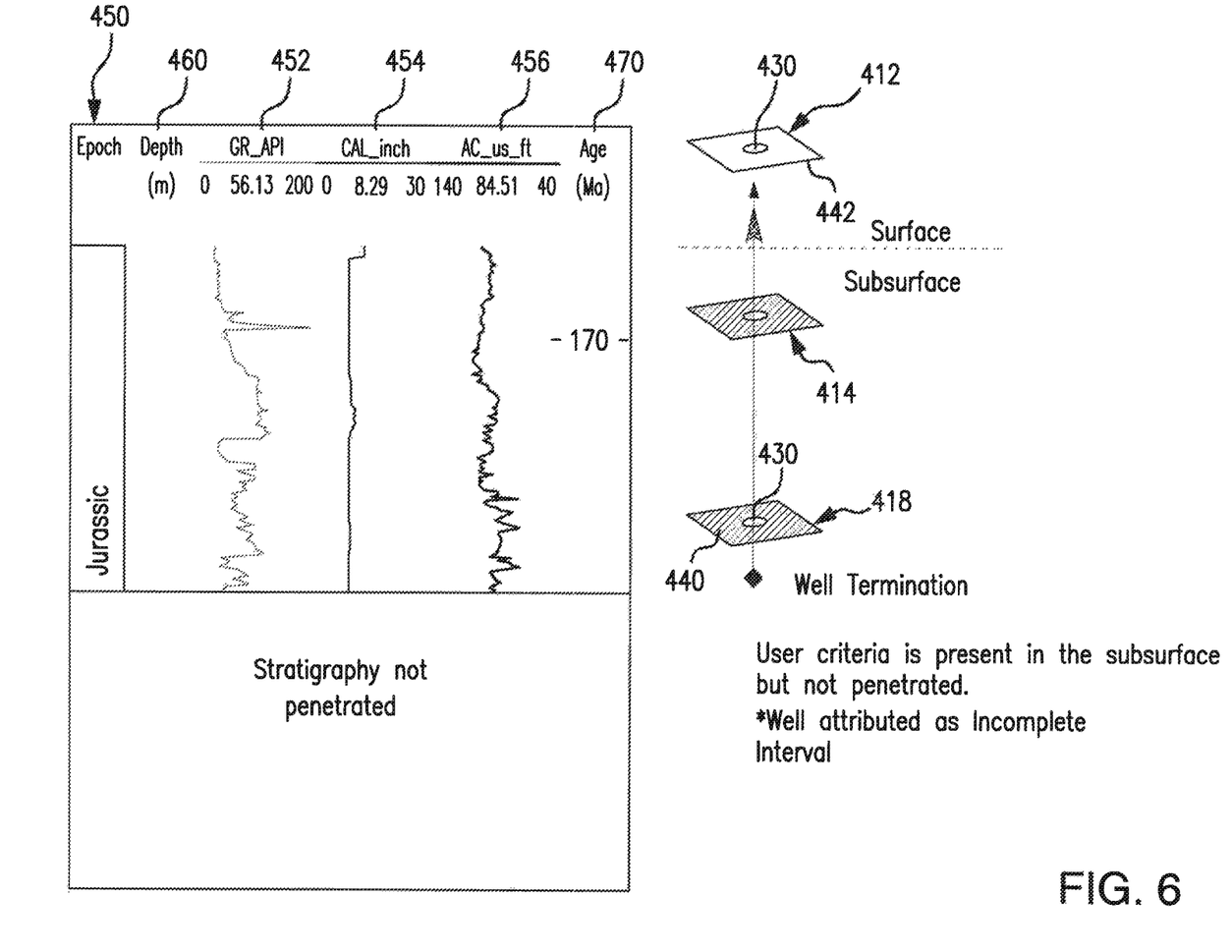

Similarly, if when performing the analytical analysis process of step 330 it is determined insufficient data is present in the one or more data sets accessed from the one or more data sources 212-216 such that a conclusive determination as to whether the user input criteria (step 310) has been met cannot be achieved, step 340, (e.g., an insufficient amount of stratigraphy was penetrated in the one or more accessed data sets—for instance, the well terminates before penetrating the full stratigraphic sequence of interest) then such notification is provided to the user, where after a user may further refine a search query for a desired subterranean rock composition (step 360). It is to be further appreciated that the wellbore processing system 210 may be configured and operational to generate and display associated output data in a 2D spatial map as shown in FIG. 6 representative of such results (as discussed further below).

With regards now to step 370, if it is determined an accessed data set regarding a wellbore does meet the user-specified input parameters (step 310), then the wellbore processing system 200 is configured and operational to generate a 2D graphical representation of a spatial map (FIG. 4) indicating a region of a geologic environment (having one or more wellbores) having a match between the user desired subterranean rock composition (310) and one or more of the accessed wellbore data sets (step 320) so as to be graphically output and displayed (preferably via a computer display component) to the user, step 380.

Figure 4:
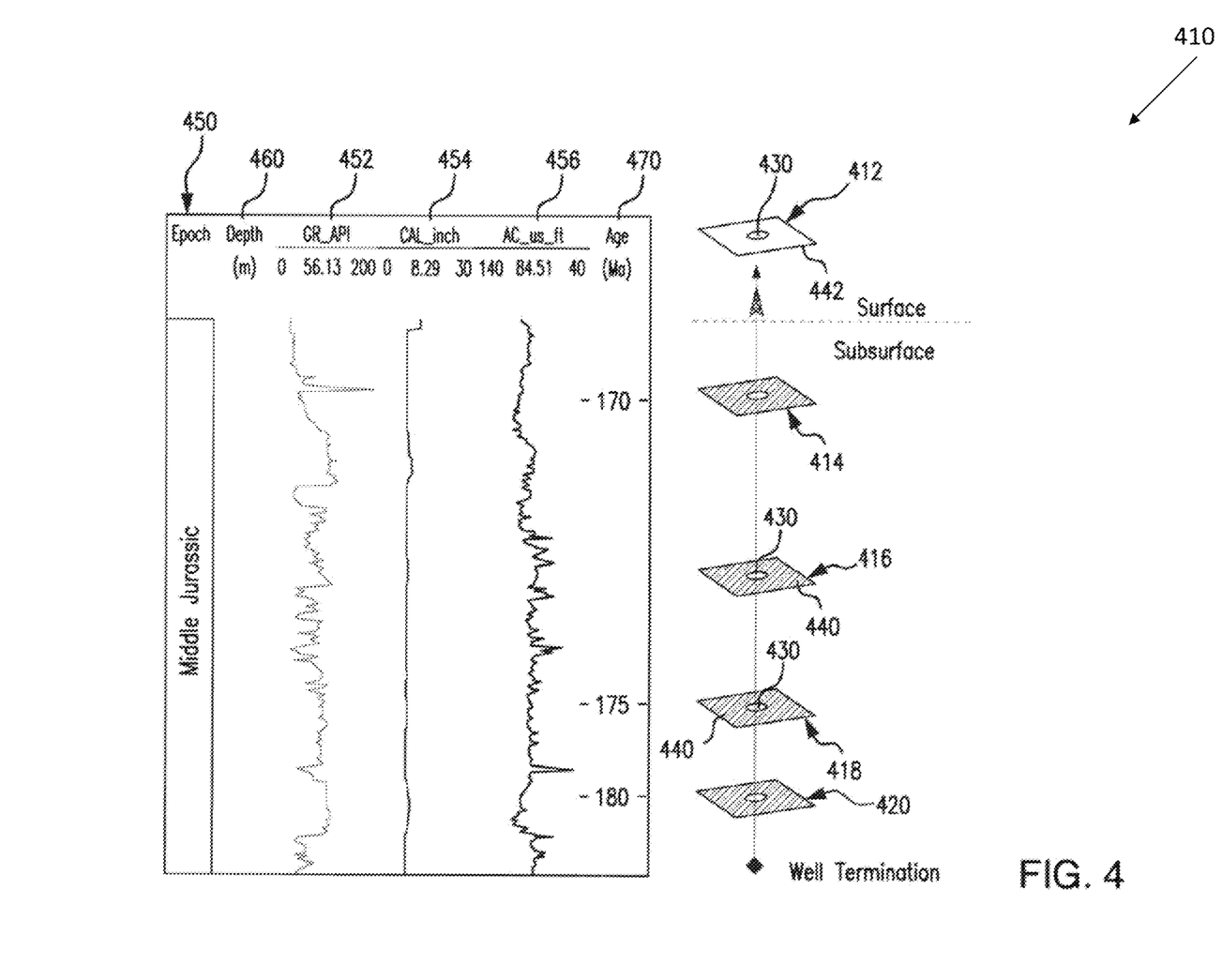
FIGS. 4-6 are screenshots illustrating example output generated by the embodiments of the present disclosure.
Figure 5:
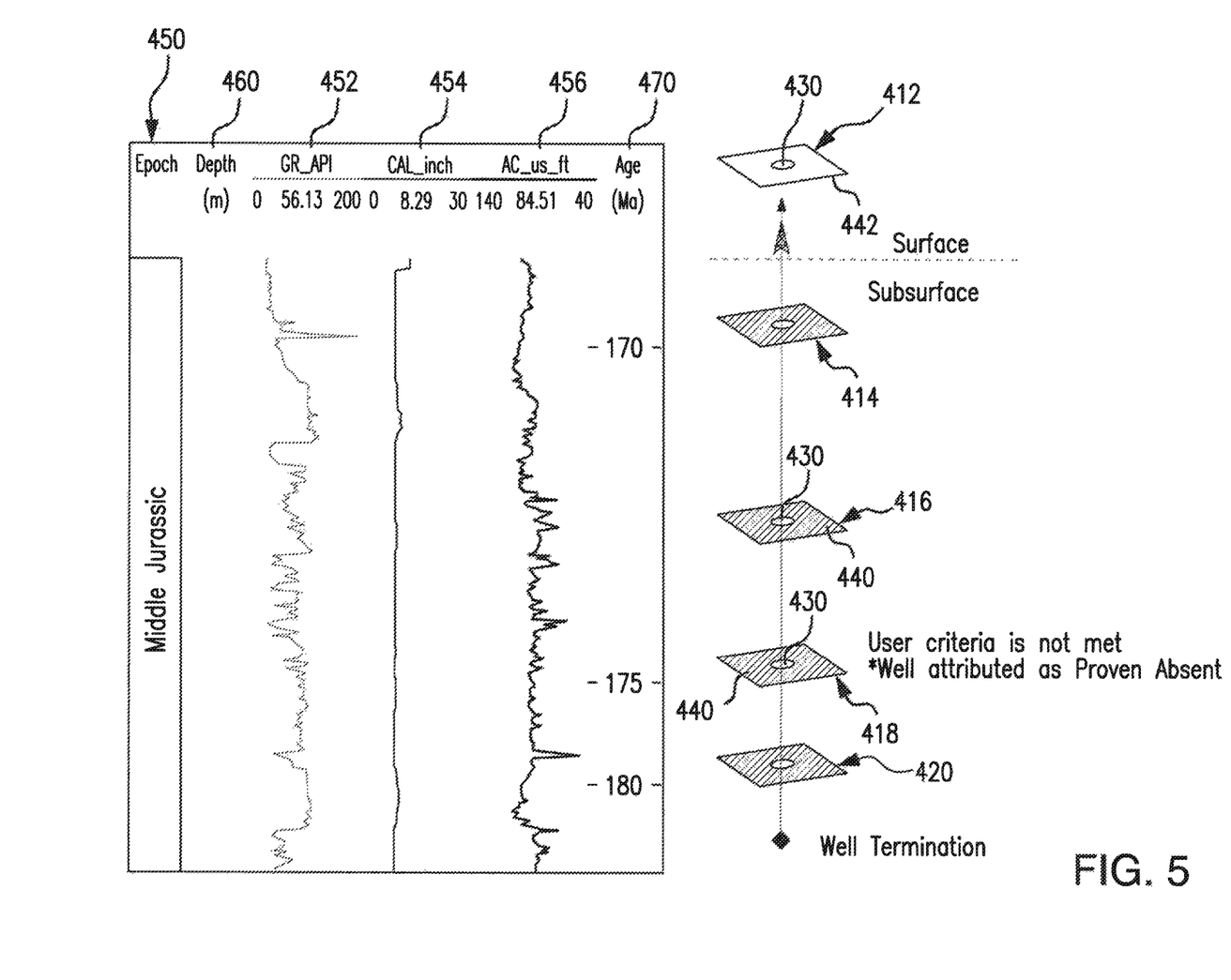

With reference now to FIG. 4, shown is the generated 2D graphical representation of a spatial map 410 indicating a region of a geologic environment having a match between the user desired subterranean rock composition (310) and one or more of the accessed wellbore data sets (step 320). Preferably, the generated 2D graphical representation includes a plurality of 2D graphical spatial representations (412-420) each representing an age and lithology of rock composition relative to a referenced subterranean depth 460. In accordance with the illustrated embodiment of FIG. 4, each 2D graphical spatial representation (412-420) includes an indicator 430 indicating if a 2D graphical spatial representation (e.g., 416, 418) is determined to match with the user desired subterranean rock composition as also preferably indicated in a 2D graphical spatial representation (e.g., 412). It is noted the indicator may consist of colored shaped (as shown in the illustrated embodiment of FIG. 4), but it is not to be limited thereto as it may encompass any indicator type suitable for the intended purpose. Additionally, each 2D graphical spatial representations (414-420) is preferably representative of a "pick" which is to be understood to be an analytical interpretation at a single point (location) down a well bore to which multiple values can be attributed, which may include rock type (as shown by the different shaded regions) accompanied by additional information such as rock age.

Each 2D graphical spatial representation (412-420) further preferably includes a shaded portion 440 indicating a determined rock lithology relative the user desired rock lithology 442. The generated 2D graphical spatial map 410 preferably includes a 2D spatial representation 412 indicative of the user desired subterranean rock composition displayed in reference to the plurality of generated 2D graphical representations (e.g., 414-420). As shown in FIG. 4, a match is found at the 2D spatial map representation 418 (at a wellbore depth of approximately 2,650 m) with that of 2D spatial representation 412 indicative of the user desired subterranean rock composition—thus the user is able to graphically comprehend an understanding of where hydrocarbon exploration is to be conducted relative to a certain wellbore.

With continued reference to FIG. 4, the generated 2D graphical representation of a spatial map 410 may further include a data chart 450 illustrated in graphic reference to the plurality of 2D graphical representations (412-420) illustrating exemplary wireline logging tools that collect signals in a wellbore. For instance, data chart 450 illustrates gamma signals 452, a determined caliper log 454 and sonic (acoustic compressional) measurements 456, which are not to be understood to be included in each generated and displayed data chart 450 as they are to be understood to be merely representative of examples of the log traces which can be used as it is to be understood there are multiple different traces that may be displayed in a data chart 450. The Data chart 450 also preferably includes a depth column 460 and rock age column 470 associated with a certain wellbore relative to the aforesaid generated 2D graphical representations (412-420).

With reference to aforementioned FIGS. 5 and 6, each is to be understood to be similar to that of above described FIG. 4, with the exception that FIG. 5 is representative of no match being found in step 340 between the user specified rock parameters (step 310) with that the accessed wellbore data sets (step 320). And FIG. 6 is representative of the scenario when performing the analytical analysis process of step 330 it is determined insufficient data is present in the one or more data sets accessed from the one or more data sources 212-216 such that a conclusive determination as to whether the user input criteria (step 310) has been met cannot be determined.

In accordance with further aspects of the disclosure a computer method for determining subterranean rock composition is provided. User input data is received having a plurality of parameters defining a desired subterranean rock composition from a wellbore. The user input data may include a specified age of stratigraphy and lithology defining the desired subterranean rock composition and may further include a defined depositional environment associated with the desired subterranean rock formation. Data associated with at least one geologic environment is received, which data contains data acquired from at least one wellbore, wherein the received geologic environment data may consist of data received from one or more databases having data associated with a plurality of geologic environments. The received geologic environment data may further contain a plurality of data sets acquired from a plurality of wellbores. An analytical analysis is then conducted by a computer processor utilizing the user input data and the received geologic environment data to determine a match between the user desired subterranean rock composition and the received geologic environment data. Output graphical data is then determined and generated, based at least in part on the analytical analysis, on a computer graphical display consisting of a two-dimensional (2D) graphical representation indicating a region of the geologic environment having a match between the user desired subterranean rock composition and the received geologic environment data. The 2D graphical representation may include a plurality of 2D graphical representations each representing an age and lithology of rock composition at a referenced subterranean depth, wherein one or more of the plurality 2D graphical representations may be provided with an indicator indicating if a 2D graphical representation is determined to match with the user desired subterranean rock composition. Each 2D graphical representation may consist of a "pick" consisting of computer rules-based interpretation of data acquired from a bore tool sensor at a prescribed subterranean depth in well bore, wherein the acquired data has a plurality of attributable values, wherein the plurality of attributable values may include rock lithology and rock age. The indicator may utilizes a color scheme to indicate a match. Further, each 2D graphical representations may have a shaded portion indicating rock lithology.

Additionally, the output data may include a 2D graphical representation indicative of the user desired subterranean rock composition displayed in reference to the plurality of generated 2D graphical representations. The output data displayed on the graphical display may further include a data chart illustrated in graphic reference to the plurality of 2D graphical representations wherein the data chart may include a well-bore depth scale and age scale indicative of rock lithology relative to an indicated well-bore depth, wherein the data chart may further include signals acquired from a bore tool sensor indicative of subterranean rock composition relative to the indicated well bore depth.

In accordance with further aspects of the disclosure a computer system having a processor and a memory is provided. The memory is coupled to the processor, wherein the memory stores programmable instructions, that when executed by the processor, cause the processor to receive user input data having a plurality of parameters defining a desired subterranean rock composition. One or more databases is accessed having stored data from one or more geologic environments. Data is then received from the one or more accessed databases wherein the received data contains data acquired from at least one well-bore. An analytical analysis is performed utilizing the user input data with the received geologic environment data to determine a match between the user desired subterranean rock composition and the received geologic environment data. Based at least in part on the analytical analysis, output data is determined and generated on a graphical display including a two-dimensional (2D) graphical representation indicating a region of the geologic environment having a match between the user desired subterranean rock composition and the received geologic environment data. The user input data may include at least a specified age of stratigraphy and lithology defining the desired subterranean rock composition, and the received data from the one or more databases may include data associated with a plurality of geologic environments, wherein each geologic environment contains a plurality of data sets acquired from a plurality of well bores. Additionally, the 2D graphical representation may include a plurality of 2D graphical representations each representing an age and lithology of rock composition at a referenced subterranean depth wherein each 2D graphical representation includes: 1) an indicator indicating if a 2D graphical representation is determined to match with the user desired subterranean rock composition; and 2) a shaded portion indicating a determined rock lithology. The output data may further include a 2D graphical representation indicative of the user desired subterranean rock composition displayed in reference to the plurality of generated 2D graphical representations, and my further include a data chart illustrated in graphic reference to the plurality of 2D graphical representations wherein the data chart includes a well-bore depth scale and age scale indicative of rock lithology relative to an indicated well-bore depth.

In accordance with further aspects of the disclosure a non-transitory computer-readable medium storing instructions is provided. When executed by a processor, the instructions cause the processor to receive user input data having a plurality of parameters defining a desired subterranean rock composition wherein the user input data includes at least a specified age of stratigraphy and lithology defining the desired subterranean rock composition. Well-bore data is received from a plurality of geologic environments each having one or more well-bores and an analytical analysis is performed on the user input data with the received geologic environment data to determine a match between the user desired subterranean rock composition and the received geologic environment data. Based at least in part on the analytical analysis, data is outputted on a graphical display including a two-dimensional (2D) graphical representation indicating a region of the geologic environment having a match between the user desired subterranean rock composition and the received geologic environment data wherein the 2D graphical representation includes a plurality of 2D graphical representations each representing an age and lithology of rock composition at a referenced subterranean depth, each 2D graphical representation including: 1) an indicator indicating if a 2D graphical representation is determined to match with the user desired subterranean rock composition; and 2) a shaded portion indicating a determined rock lithology, wherein the output data further includes a 2D graphical representation indicative of the user desired subterranean rock composition displayed in reference to the plurality of generated 2D graphical representations.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary illustrated embodiments of the present disclosure, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A method, implemented by a computer, for determining subterranean rock composition, the method comprising:
   receiving user input data having a plurality of parameters defining a desired subterranean rock composition;
   receiving data associated with at least one geologic environment wherein the data contains data acquired from at least one wellbore;
   determining, based on the received geologic environment data and the user input data, a match between the user desired subterranean rock composition and the received geologic environment data; and
   based at least in part on determining the match, outputting data on a graphical display, the data including a plurality of two-dimensional (2D) graphical representations indicating a region of the geologic environment having a match between the user desired subterranean rock composition and the received geologic environment data, wherein each 2D graphical representation of the plurality of 2D graphical representations represents an age and lithology of rock composition at a referenced subterranean depth, wherein each 2D graphical representation of the plurality of 2D graphical representations includes: 1) an indicator indicating if a 2D graphical representation is determined to match with the user desired subterranean rock composition, and 2) a shaded portion indicating a determined rock lithology, and wherein the output data further includes a 2D graphical representation indicative of the user desired subterranean rock composition displayed in reference to the plurality of generated 2D graphical representations.

2. The computer method as recited in claim 1, wherein the user input data includes a specified age of stratigraphy and lithology defining the desired subterranean rock composition.

3. The computer method as recited in claim 1, wherein the user input data further includes a depositional environment associated with the desired subterranean rock formation.

4. The computer method as recited in claim 2, wherein the received geologic environment data consists of data received from one or more databases having data associated with a plurality of geologic environments.

5. The computer method as recited in claim 4, wherein each geologic environment contains a plurality of data sets acquired from a plurality of wellbores.

6. The computer method as recited in claim 4, wherein one or more of the plurality of 2D graphical representations is provided with an indicator indicating if a 2D graphical representation is determined to match with the user desired subterranean rock composition.

7. The computer method as recited in claim 1, wherein the output data includes a 2D graphical representation indicative of the user desired subterranean rock composition displayed in reference to the plurality of generated 2D graphical representations.

8. The computer method as recited in claim 1, wherein each 2D graphical representation comprises a computer rules-based interpretation of data acquired from a bore tool sensor at a prescribed subterranean depth in the at least one wellbore, wherein the acquired data has a plurality of attributable values.

9. The computer method as recited in claim 8, wherein the plurality of attributable values include rock lithology and rock age.

10. The computer method as recited in claim 1, wherein the output data displayed on the graphical display further includes a data chart illustrated in graphic reference to the plurality of 2D graphical representations wherein the data chart includes a wellbore depth scale and age scale indicative of rock lithology relative to an indicated well bore depth.

11. The computer method as recited in claim 10, wherein the data chart further includes signals acquired from a bore tool sensor indicative of subterranean rock composition relative to the indicated well bore depth.

12. A computer system for determining subterranean rock composition, comprising:
   a processor;
   memory accessible by the processor;
   instructions stored in the memory and executable by the processor to instruct the system to:
      receive user input data having a plurality of parameters defining a desired subterranean rock composition;
      access one or more databases having stored data from one or more geologic environments;
      receive data from the one or more accessed databases wherein the received data contains data acquired from at least one well bore;
      determining, based on the received geologic environment data and the user input data, a match between the user desired subterranean rock composition and the received geologic environment data; and
      based at least in part on determining the match, outputting data on a graphical display, the data including a plurality of two-dimensional (2D) graphical representations indicating a region of the geologic environment having a match between the user desired subterranean rock composition and the received geologic environment data, wherein each 2D graphical representation of the plurality of 2D graphical representations represents an age and lithology of rock composition at a referenced subterranean depth, wherein each 2D graphical representation of the plurality of 2D graphical representations includes: 1) an indicator indicating if a 2D graphical representation is determined to match with the user desired subterranean rock composition, and 2) a shaded portion indicating a determined rock lithology, and wherein the output data further includes a 2D graphical representation indicative of the user desired subterranean rock composition displayed in reference to the plurality of generated 2D graphical representations.

13. The computer system as recited in claim 12, wherein the user input data includes at least a specified age of stratigraphy and lithology defining the desired subterranean rock composition.

14. The computer system as recited in claim 12, wherein the received data from the one or more databases includes data associated with a plurality of geologic environments, wherein each geologic environment contains a plurality of data sets acquired from a plurality of well bores.

15. The computer system as recited in claim 12, wherein the output data displayed on the graphical display further includes a data chart illustrated in graphic reference to the plurality of 2D graphical representations wherein the data chart includes a well bore depth scale and age scale indicative of rock lithology relative to an indicated well bore depth.

16. A non-transitory computer-readable storage medium and one or more computer programs embedded in the non-transitory computer-readable storage medium, the computer programs comprising instructions, which when executed by a computer system, cause the computer system to:
- receive user input data having a plurality of parameters defining a desired subterranean rock composition wherein the user input data includes at least a specified age of stratigraphy and lithology defining the desired subterranean rock composition;
- receive well bore data from a plurality of geologic environments each having one or more well bores;
- determining, based on the received geologic environment data and the user input data, a match between the user desired subterranean rock composition and the received geologic environment data; and
- based at least in part on determining the match, outputting data on a graphical display, the data including a plurality of two-dimensional (2D) graphical representations indicating a region of the geologic environment having a match between the user desired subterranean rock composition and the received geologic environment data, wherein each 2D graphical representation of the plurality of 2D graphical representations represents an age and lithology of rock composition at a referenced subterranean depth, wherein each 2D graphical representation of the plurality of 2D graphical representations includes: 1) an indicator indicating if a 2D graphical representation is determined to match with the user desired subterranean rock composition, and 2) a shaded portion indicating a determined rock lithology, and wherein the output data further includes a 2D graphical representation indicative of the user desired subterranean rock composition displayed in reference to the plurality of generated 2D graphical representations.

* * * * *